(12) United States Patent
Matayoshi et al.

(10) Patent No.: US 6,209,514 B1
(45) Date of Patent: Apr. 3, 2001

(54) DIRECT INJECTION GASOLINE ENGINE

(75) Inventors: Yutaka Matayoshi; Nobuhisa Jingu, both of Kanagawa; Tadashi Nomura, Yokohama; Tsuyoshi Masuda, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/576,258

(22) Filed: May 24, 2000

Related U.S. Application Data

(63) Continuation of application No. 09/081,071, filed on May 19, 1998, now Pat. No. 6,092,501.

(30) Foreign Application Priority Data

| May 20, 1997 | (JP) | ................................................ 9-129053 |
| May 23, 1997 | (JP) | ................................................ 9-132673 |
| May 26, 1997 | (JP) | ................................................ 9-135269 |
| May 28, 1997 | (JP) | ................................................ 9-137369 |

(51) Int. Cl.$^7$ .................................................. F02B 31/00
(52) U.S. Cl. ........................... 123/301; 123/276; 123/305
(58) Field of Search ..................... 123/262, 263, 123/276, 279, 295, 301, 305, 308

(56) References Cited

U.S. PATENT DOCUMENTS

| 5,115,774 | 5/1992 | Nomura et al. ....................... 123/302 |
| 5,140,958 | 8/1992 | Kobayashi et al. ................... 123/276 |
| 5,553,588 | 9/1996 | Gono et al. ........................... 123/276 |
| 5,709,190 | 1/1998 | Suzuki ................................. 123/302 |
| 5,711,269 | 1/1998 | Oda et al. ............................. 123/262 |
| 5,720,253 | 2/1998 | Matoba et al. ....................... 123/301 |
| 5,806,482 | 9/1998 | Igarashi et al. ...................... 123/305 |
| 5,816,215 | 10/1998 | Yoshikawa et al. ................. 123/305 |
| 5,979,399 | * 11/1999 | Piock et al. .......................... 123/305 |
| 6,092,501 | * 7/2000 | Matayoshi et al. .................. 123/301 |

FOREIGN PATENT DOCUMENTS

| 57-198306 | 12/1982 | (JP) . |
| 6-185321 | 7/1994 | (JP) . |
| 8-35429 | 2/1996 | (JP) . |

* cited by examiner

*Primary Examiner*—John Kwon
(74) *Attorney, Agent, or Firm*—Foley & Lardner

(57) ABSTRACT

A direct injection internal combustion gasoline engine has a piston 4 which includes a first inclined surface 22 approximately parallel to an intake-side inclined surface 11a of a cylinder head and a second inclined surface 23 approximately parallel to an exhaust-side inclined surface 11b of the cylinder head. A cavity combustion chamber 12 is recessed in the first inclined surface. A pair of valve recesses 31, 32 is also recessed in the first inclined surface. An arcuate dam section 21a is formed along the periphery of the valve recesses with the first inclined surface.

28 Claims, 5 Drawing Sheets

DIRECT INJECTION GASOLINE ENGINE

The applicants is a continuation of prior U.S. application Ser. No. 09/081,071, filed May 19, 1998 now U.S. Pat. No. 6,092,501. The entire contents of this 09/081,071 application are incorporated herein by reference.

BACKGROUND OF THE INVENTION

The invention relates to a direct injection type internal combustion gasoline engine and particularly to improvements in direct injection type internal combustion engines which employ both homogeneous charge combustion and stratified charge combustion.

A conventional engine injects gasoline into the air intake port upstream of the combustion chamber. The air-fuel mixture is then transported to the combustion chamber where it is burned. In contrast to this arrangement, a direct injection gasoline engine has the fuel injector located inside the combustion chamber so that the fuel is injected directly into the cylinder.

SUMMARY OF THE INVENTION

It is an object of the invention to provide an improved direct injection engine.

The engine of the present invention has a piston which includes a first inclined surface approximately parallel to an intake-side inclined surface of a cylinder head and a second inclined surface approximately parallel to an exhaust-side inclined surface of the cylinder head. A cavity combustion chamber is recessed in the first inclined surface. A pair of valve recesses is also recessed in the first inclined surface. An arcuate dam section is formed along the periphery of the valve recesses with the first inclined surface.

BRIEF DESCRIPTION OF THE DRAWINGS

The invention will be described in further detail below with reference to the accompanying drawings, wherein.

DETAILED DESCRIPTION OF THE PREFERRED EMBODIMENTS

Figure 1:
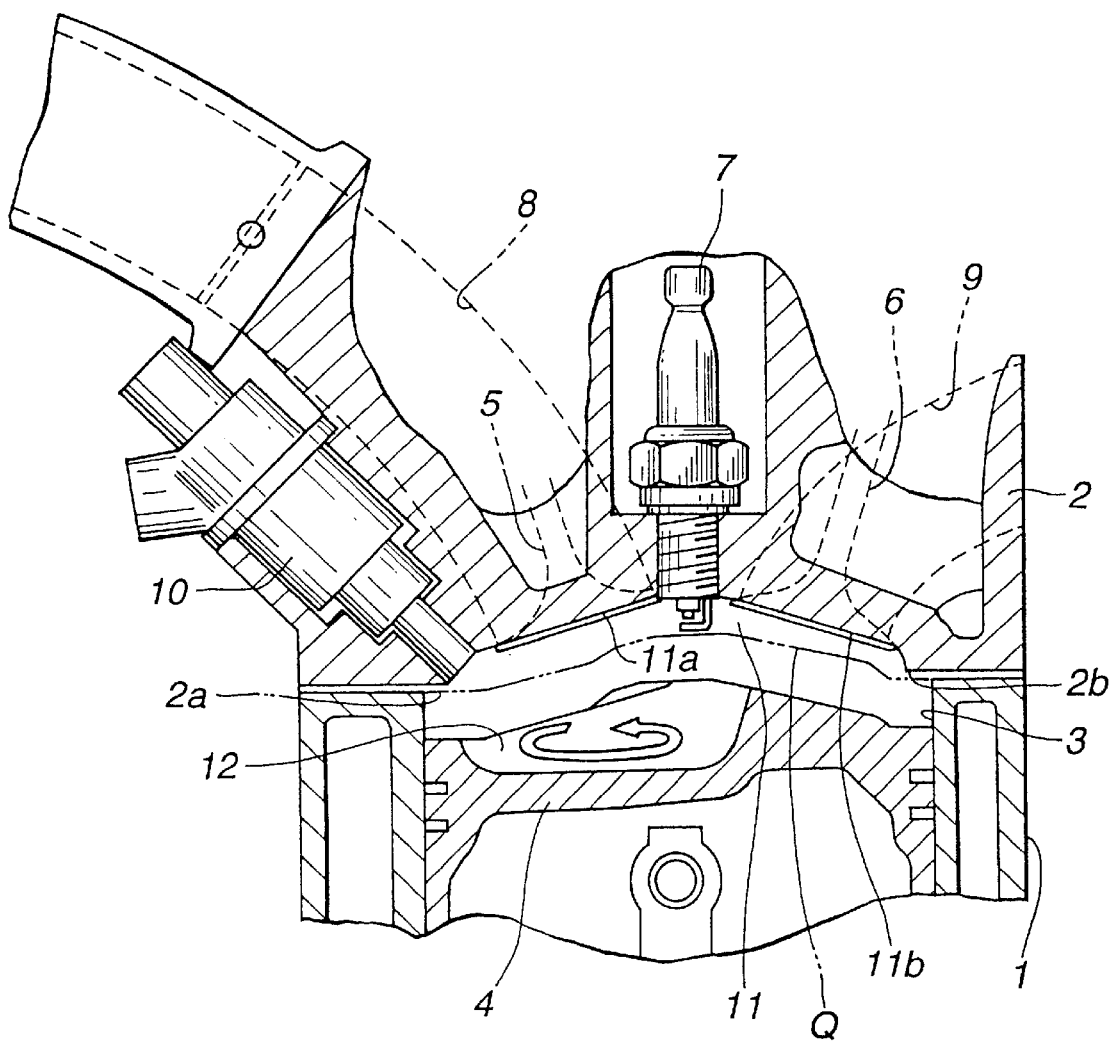
FIG. 1 is a vertical cross-sectional view showing an arrangement of a direct injection type internal combustion engine according to an embodiment of the present invention.

First, an overall arrangement of a direct injection type internal combustion gasoline engine will be discussed with reference to FIG. 1.

A plurality of cylinders 3 are disposed in line in a cylinder block 1. A cylinder head 2 is fixed to cover the upper surface of the cylinder block 1. A piston 4 is slidably fitted in the cylinder 3. Additionally, a combustion chamber 11 is formed recessed in the cylinder head 2 and is arranged in a so-called pent roof type configuration, in which a pair of intake valves 5 are disposed at one inclined surface 11a of the combustion chamber, while a pair of exhaust valves 6 are disposed at another inclined surface 11b. A spark plug 7 is disposed at the generally central position surrounded by the pair of intake valves 5 and the pair of exhaust valves 6. The cylinder head 2 is formed with a pair of intake ports 8 which correspond respectively to the pair of intake valves 5. Additionally, exhaust ports 9 are formed corresponding to the exhaust valves 6.

A generally cylindrical electromagnetic fuel injector valve 10 is disposed at the lower surface section of the cylinder head 2. The lower surface section is located adjacent to the side wall of the cylinder 3 at the side of the intake valves 5. The fuel injector valve 10 is installed in a posture wherein its center axis is directed obliquely downward. The fuel injector valve 10 is disposed between the two intake valves 5.

A cavity combustion chamber 12 is formed at the top section of the piston 4 and is offset toward the intake valves 5. A spray axis of the fuel injector valve 10 is directed to this cavity combustion chamber 12 when the piston is near the top dead center.

Figure 2:
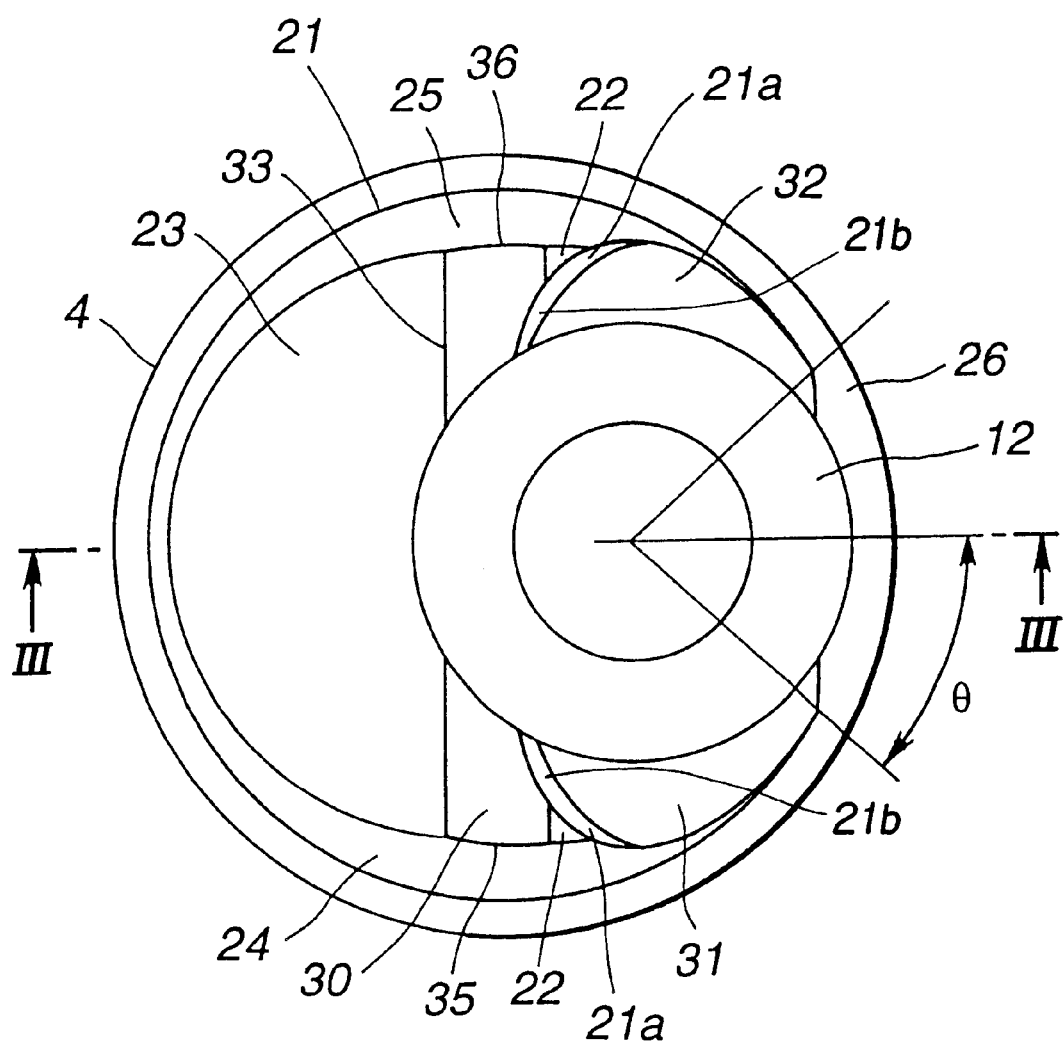
FIG. 2 is a plan view showing a piston according to an embodiment of this invention.
Figure 3:
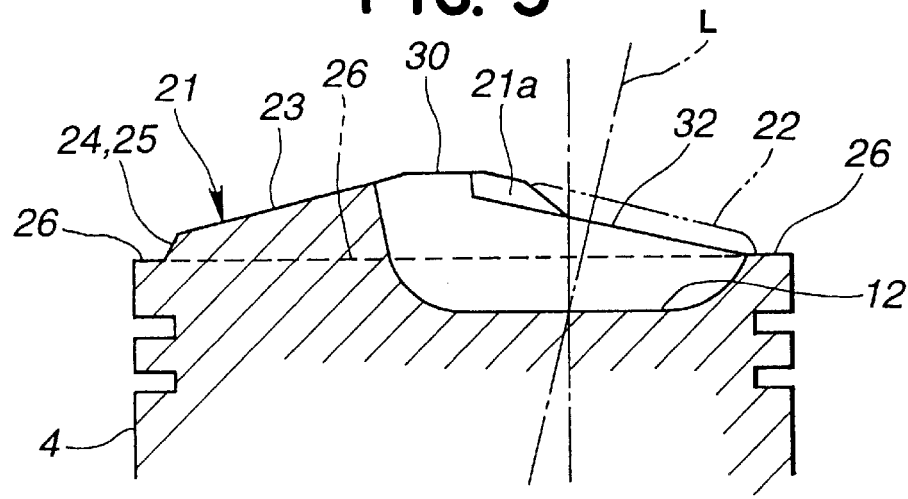
FIG. 3 is a cross-sectional view taken along the line III—III in FIG. 2.

FIGS. 2 and 3 show the design of piston 4 in detail. Piston 4 has a first inclined surface 22 approximately parallel to the intake-side inclined surface 11a of the cylinder head and a second inclined surface 23 approximately parallel to the exhaust-side inclined surface 11b of the cylinder head. Side surfaces 24, 25 are connected to the first and the second inclined surfaces. Cavity combustion chamber 12 is recessed in the first inclined surface. A pair of valve recesses 31, 32 is also recessed in the first inclined surface. An arcuate dam section 21a is formed along the periphery of the valve recesses with the first inclined surface.

In this embodiment, a flat plane 30 is located between top ends of the first and second inclined surface. A second arcuate dam section 21b is formed along the periphery of the valve recesses with the flat plane.

The valve recesses avoid interference between the intake valves and the piston. However, if the valve recesses are merely added, the inside and outside of the cavity combustion chamber may be brought into communication through the valve recesses, and therefore performance is reduced.

In this embodiment, intake valve-side inclined surface 22 is relatively small due to formation of valve recesses 31, 32 and the cavity combustion chamber 12. Therefore, a major part of the intake valve-side inclined surface 22 is an imaginary plane, as indicated by a dotted line in FIG. 3. Additionally, conical side surfaces 24, 25 are contiguous with each other, extending through the lower edge of an exhaust valve-side inclined surface 23, in this embodiment.

The apex angle of the conical side surfaces 24, 25 is very small, and therefore the conical side surfaces 24, 25 rise steeply, as shown in FIG. 3. Along with this, the location of ridgelines 35, 36 between the conical side surfaces 24, 25 and the top horizontal surface (or plane) 30 approaches the outer peripheral side of the piston 4. Because of this, clearance formed between the conical side surfaces 24, 25 and the combustion chamber 11 at the side of the cylinder head 2 is very small when the piston 4 is at top dead center, such that the major portion of volume left in the cylinder 3 is occupied by the cavity combustion chamber 12.

A piston standard horizontal surface 26 is formed at the outer periphery. This piston standard horizontal surface 26 is constituted as one plane perpendicular to the center axis of the piston 4 and is continuous throughout the entire periphery of the piston 4, in this embodiment. Parts at a thrust side and an anti-thrust side of this piston standard horizontal surface 26 correspond respectively to squish areas 2a, 2b (see FIG. 1) left as flat surfaces at opposite sides of the combustion chamber 11 at the side of the cylinder head 2, thereby contributing to production of squish.

The cavity combustion chamber 12 is recessed throughout the top horizontal surface 30 and the intake valve-side inclined surface 22. The cavity combustion chamber 12 is round in a plan view of the piston 4. The bottom surface of the cavity combustion chamber 12 is in a plane perpendicular to the center axis of the piston 4. Additionally, the outer periphery of the cavity combustion chamber 12 is located inside a pair of imaginary side ridgelines between the conical side surfaces 24, 25 and the intake valve-side inclined surface 22. In other words, in the direction of the piston pin axis, the intake valve-side inclined surface 22 is larger than the cavity combustion chamber 12. In contrast, a portion of the outer periphery of the cavity combustion chamber 12 close to the exhaust valves slightly extends over the exhaust valve-side top ridgeline 33 between the top horizontal surface 30 and the exhaust valve-side inclined surface 23, toward the exhaust valves. This is because, in this embodiment, the piston has a relatively small diameter (such as for a 1.8 liter, 4 cylinder engine). Additionally, as shown in FIG. 1, the spark plug 7 is disposed to enter the cavity combustion chamber 12 and is located at the outer peripheral section of the cavity combustion chamber when the piston 4 is at top dead center.

Valve recesses 31, 32 are formed recessed corresponding to the valve head sections of the intake valves 5 at the intake valve-side inclined surface 22. Recesses 31, 32 allow a large intake valve lift amount. These valve recesses 31, 32 are formed in a relatively shallow circular-shape and along the valve inclination angle, and are superposed on the cavity combustion chamber 12 such that each recess appears in a crescent shape. The reference character L in FIG. 3 indicates the center axis of each intake valve 5. In this embodiment, a portion of the outer periphery of valve recesses 31, 32 reaches the vicinity of the imaginary side ridgelines between the conical side surfaces 24, 25 and the inclined surface 22. Ridgelines 35, 36 at the opposite ends of the top horizontal surface 30 in the direction of the piston pin axis are located close to the outer periphery of the piston 4, and therefore the ridgelines 35, 36 are located outside the end edge position of each valve recess 31, 32 in the direction of the piston pin axis as viewed in the direction of the piston pin axis. Valve recesses 31, 32 have a depth such that the recesses are not lower than the piston standard horizontal surface 26 in the axial direction of the piston 4. In other words, as apparent from FIG. 3, valve recesses 31, 32 are not depressed below the piston standard horizontal surface 26.

The structure of the top section of the piston 4 configured as discussed above is symmetrical with respect to a diametrical line, serving as a center and perpendicular to the piston pin. Fuel injector valve 10 is located to inject fuel along this line serving as a symmetry axis.

The valve recesses 31, 32 are formed recessed at the intake valve-side inclined surface 22, as discussed above, and therefore outer peripheral sections 21a and 21b are left in the shape of an arcuate dam, along the outer periphery of the valve recesses 31, 32. Valve recesses 31, 32 are gradually lowered in accordance with the inclination of the intake valve-side inclined surface 22 in a direction toward the intake valve side of the piston 4. The projection section 21 of piston 4 (the portion projecting from the top of the piston) ultimately becomes the same in height as the piston standard horizontal surface 26 and disappears. Here, a line connecting the tip end disappearing point of this projection section 21 and the center of the cavity combustion chamber 12 forms an angle (see FIG. 2) of not larger than 45° (relative to the above-mentioned line III —III). This minimizes gas flow from the cylinder outer peripheral section through the valve recesses into the cavity combustion chamber.

When the piston 4 comes near its top dead center position after fuel is injected toward the cavity combustion chamber 12 at the latter half of the compression stroke, the respective surfaces of the projection section 21 respectively approach the corresponding surfaces of the cylinder head 2 as indicated by a dotted line Q in FIG. 1, so that the cavity combustion chamber 12 is well sealed at its entire periphery. Accordingly, combustion proceeds and leakage of swirl and the air-fuel mixture inside the cavity combustion chamber 12 is prevented from leaking to the outside.

Valve recesses 31, 32 are formed depressed and superposed on the cavity combustion chamber 12. However, valve recesses 31, 32 are not depressed below the piston standard horizontal surface 26, as discussed above. As a result, when the piston 4 is near top dead center, a swirl component along the outer peripheral section of the cylinder 3 does not enter the valve recesses 31, 32 and instead flows on the piston standard horizontal surface 26 at the outer peripheral section, thereby suppressing entrance of this swirl component into the cavity combustion chamber 12. Since the side section of the valve recesses 31, 32 is surrounded by the projection section outer peripheral section 21a (and 21b), gas flow flowing on the piston standard horizontal surface 26 is suppressed from flowing into the valve recesses 31, 32. Further, since the top horizontal surface 30 extends in the direction of the piston pin axis between a portion of the cavity combustion chamber 12 and valve recesses 31, 32 and the exhaust valve-side inclined surface 23, gas flow from the exhaust valve side of the cylinder 3 toward the cavity combustion chamber 12 is interrupted and weakened. Accordingly, swirl flow and fuel inside the cavity combustion chamber 12 is not disturbed by gas flow from outside of the cavity combustion chamber 12, and adverse influence due to formation of the valve recesses 31, 32 is minimized, thereby ensuring good stratified charge combustion.

Figure 4:
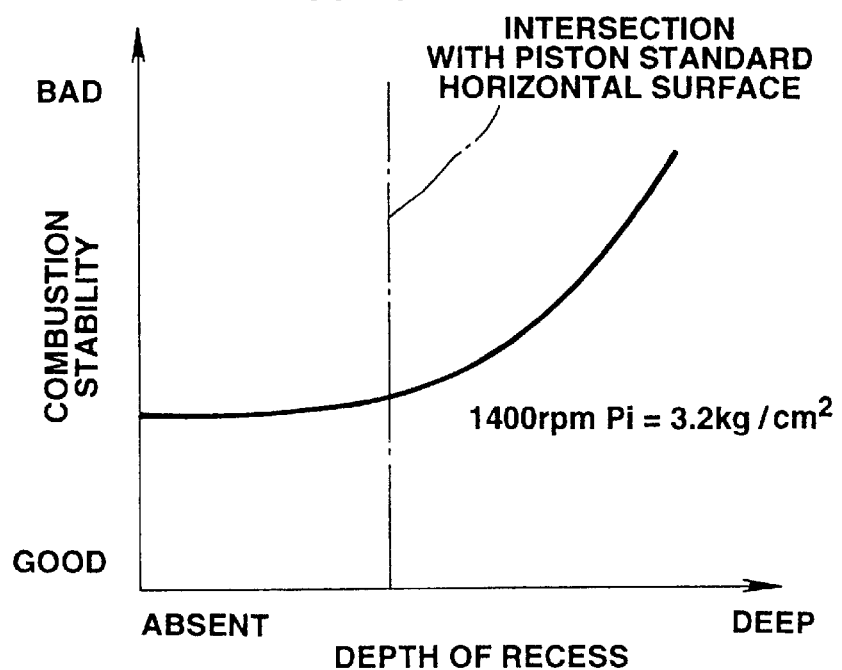
FIG. 4 is a characteristic graph showing the relationship between the depth of a valve recess and the stability of stratified charge combustion.

FIG. 4 shows results of experiments examining the relationship between the depth of the valve recesses 31, 32 and the combustion stability during stratified charge combustion. As shown by FIG. 4, the combustion stability is abruptly degraded if the valve recesses 31, 32 are recessed below the piston standard horizontal surface 26. Conversely, degradation in combustion stability, due to the valve recesses 31, 32, is small if the depth of the valve recesses does not exceed the piston standard horizontal surface 26.

Figure 5:
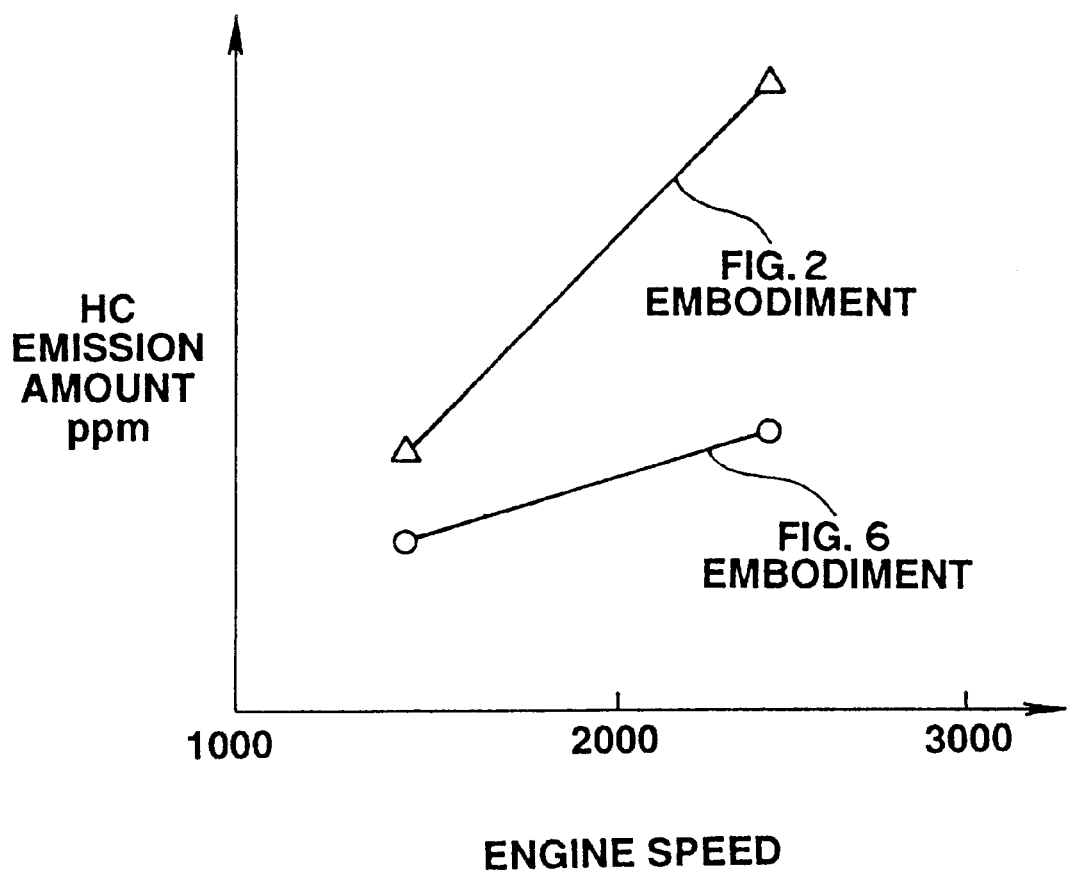
FIG. 5 is a characteristic graph showing the relationship between the presence and absence of a projection section outer peripheral section and the HC emission amount.
Figure 6:
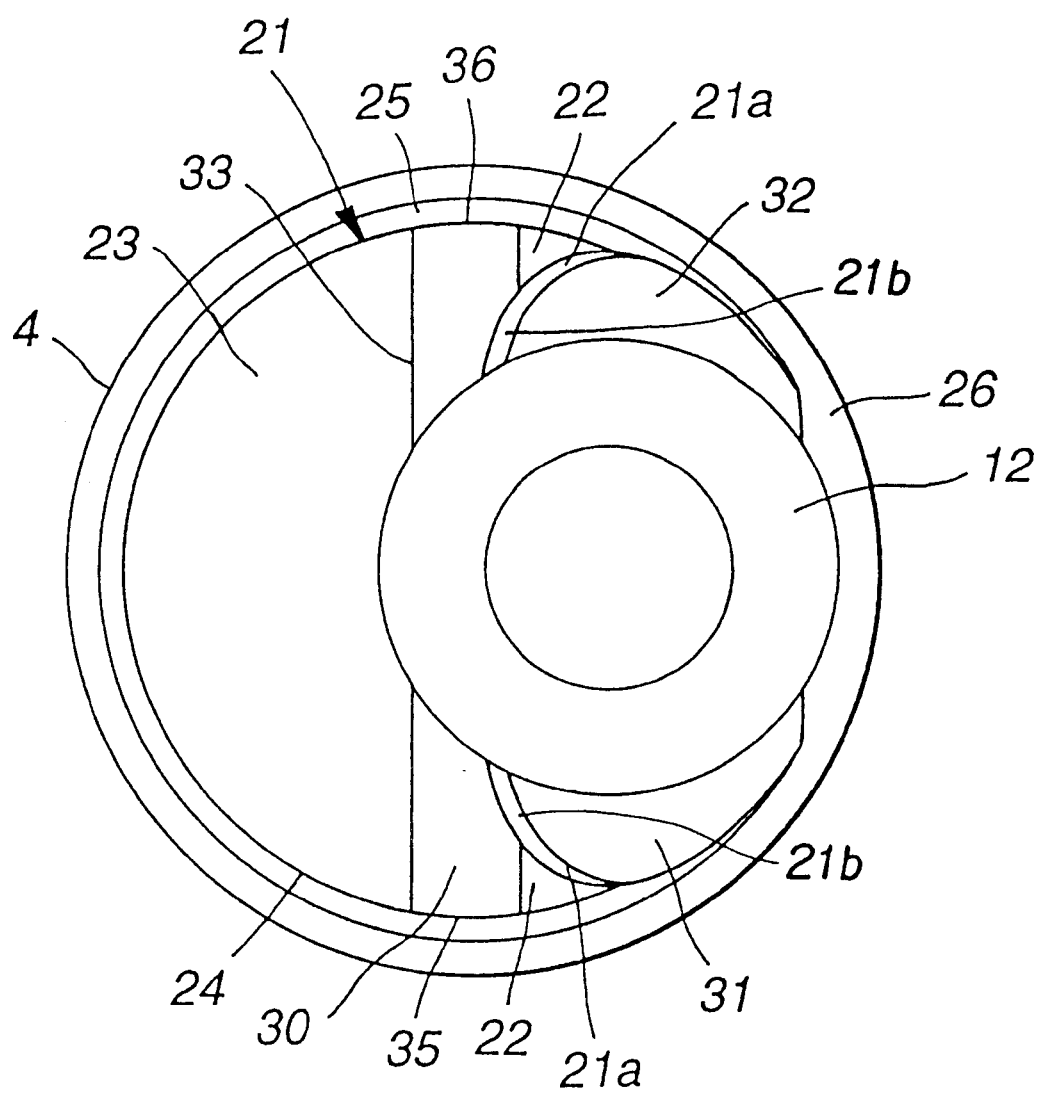
FIG. 6 is a plan view showing a piston according to another embodiment of this invention.

FIG. 5 shows results of experiments which examine the effect of moving the position of ridgelines 35, 36 along the piston pin direction (that is, the length of the top horizontal surface 30). In FIG. 5, one curve indicates HC emission amount in the embodiment of FIG. 6 wherein the top horizontal surface 30 is longer than the combined length of the valve recesses 31, 32 in the piston pin direction. In the FIG. 6 embodiment, the ridgelines 35, 36 are placed near the cylinder wall, that is, closer to the cylinder wall than valve recesses 31, 32, in the piston pin direction. The other curve in FIG. 5 indicates HC emission amount for the FIG. 2 embodiment. In the FIG. 2 embodiment, ridgelines 35, 36 are inside the ridges of the valve recesses 31, 32 in the piston pin direction. In other words, in the FIG. 2 embodiment, the length of top horizontal surface 30 is shorter than the combined length of the valve recesses 31, 32. As apparent from a comparison between these two curves, lowering of the HC emission amount can be achieved by positioning the ridgelines 35, 36, on the periphery of piston 4.

This invention provides for a large valve lift amount at top dead center. Also, the swirl component turning along the cylinder outer peripheral section is prevented from flowing into the cavity combustion chamber through the valve recess during stratified charge combustion.

The entire contents of Japanese Patent Applications P9-135269 (filed May 26, 1997), P9-137369 (filed May 28, 1997), P9-132673 (filed May 23, 1997), P9-129053 (filed May 20, 1997), and Press Information entitled "Nissan Direct-Injection Engine"(Document E1-2200-9709 of Nissan Motor Co., Ltd. of Tokyo, Japan) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, the cavity combustion chamber can be oval in shape. The fuel injection techniques and valve lifting techniques described in the 09/081,071 application (which is incorporated by reference) can be employed in connection with the piston and engine arrangements described above. The scope of the invention is defined with reference to the following claims.

We claim:

1. A piston for an internal combustion gasoline engine having an injector which injects fuel directly into a cylinder, the piston comprising:
    a first inclined surface approximately parallel to an intake-side inclined surface of a cylinder head;
    a second inclined surface approximately parallel to an exhaust-side inclined surface of the cylinder head;
    side surfaces connected to the first and the second inclined surfaces;
    a cavity combustion chamber recessed in the first inclined surface;
    a pair of valve recesses recessed in the first inclined surface; and
    an arcuate dam section formed along the periphery of the valve recesses with the first inclined surface.

2. A piston as set forth in claim 1, further comprising:
    a flat plane between top ends of the first and second inclined surface, the flat plane perpendicular to the axis of the piston; and
    a second arcuate dam section formed along the periphery of the valve recesses with the flat plane.

3. A piston as set forth in claim 1, wherein the first inclined surface, the second inclined surface, the side surfaces and the cavity combustion chamber are formed symmetrical with respect to a line which is perpendicular to a piston pin.

4. A piston as set forth in claim 1, wherein the cavity combustion chamber intersects with the second inclined surface.

5. A piston as set forth in claim 1, wherein the cavity combustion chamber is formed with a substantially flat bottom.

6. A piston as set forth in claim 1, further comprising:
    a flat plane between top ends of the first and second inclined surface, the flat plane perpendicular to the axis of the piston.

7. A piston as set forth in claim 1, wherein the cavity combustion chamber is a circle in plan view.

8. A piston as set forth in claim 1, further comprising:
    a horizontal surface formed on an outer region of the piston.

9. A piston as set forth in claim 4, wherein the cavity combustion chamber is formed with a substantially flat bottom.

10. A piston as set forth in claim 6, wherein the length of the flat plane in a direction parallel to a piston pin is approximately as long as both of the valve recesses.

11. A piston as set forth in claim 8, wherein the depth of the valve recesses is not deeper than the horizontal surface.

12. A piston as set forth in claim 1, wherein the side surfaces have the shape of part of a cone.

13. A piston as set forth in claim 1, further comprising:
    a bow-shaped squish area on the intake side.

14. A piston as set forth in claim 1, wherein the cavity combustion chamber is an oval in plan view.

15. An internal combustion gasoline engine, comprising:
    a cylinder;
    a cylinder head at a head of the cylinder;
    a piston within the cylinder;
    a fuel injector to inject fuel in the form of gasoline directly into the cylinder; and
    an ignition plug, in the cylinder head, to ignite an air-fuel mixture in the cylinder;
    wherein the piston includes
        a first inclined surface approximately parallel to an intake-side inclined surface of the cylinder head;
        a second inclined surface, approximately parallel to an exhaust-side inclined surface of the cylinder head;
        side surfaces connected to the first and the second inclined surfaces;
        a cavity combustion chamber recessed in the first inclined surface;
        a pair of valve recesses recessed in the first inclined surface; and
        an arcuate dam section formed along the periphery of the valve recesses with the first inclined surface.

16. An engine as set forth in claim 15, wherein the piston further comprises:
    a flat plane between top ends of the first and second inclined surface, the flat plane perpendicular to the axis of the piston; and
    a second arcuate dam section formed along the periphery of the valve recesses with the flat plane.

17. An engine as set forth in claim 15, further comprising:
    a valve lifting mechanism to control valve lifting with variable timings.

18. An engine as set forth in claim 15, wherein the fuel injector directs fuel along an axis directed at the center of the cavity combustion chamber when the piston is near top dead center.

19. An engine as set forth in claim 15, wherein the cavity combustion chamber intersects with the second inclined surface.

20. An engine as set forth in claim 15, wherein the cavity combustion chamber is formed with a substantially flat bottom.

21. An engine as set forth in claim 15, further comprising:
    a flat plane between top ends of the first and the second inclined surface, the flat plane perpendicular to the axis of the piston.

22. An engine as set forth in claim 15, wherein the cavity combustion chamber is a circle in plan view.

23. An engine as set forth in claim 15, wherein the cavity combustion chamber is an oval in plan view.

24. An engine as set forth in claim 15, further comprising:
a horizontal surface formed on an outer region of the piston.

25. An engine as set forth in claim 24, wherein the depth of the valve recesses is not deeper than the horizontal surface.

26. A piston for an internal combustion gasoline engine having an injector which injects fuel directly into a cylinder, the piston comprising:
an exhaust-side inclined surface approximately parallel to an exhaust-side inclined surface of a cylinder head;
an opposite-side surface connected to the exhaust-side inclined surface along a ridgeline;
side surfaces connected to the exhaust-side inclined surface and the opposite-side surface;
a cavity combustion chamber recessed in the opposite-side surface;
a pair of valve recesses recessed in the opposite-side surface; and
an arcuate dam formed along the periphery of the valve recesses with the opposite-side surface.

27. A piston as set forth in claim 26, wherein the opposite-side surface includes an intake-side inclined surface.

28. A piston as set forth in claim 26, wherein the opposite-side surface includes an intake-side inclined surface and a horizontal flat plane.

* * * * *